United States Patent
Florance et al.

[15] 3,651,399
[45] Mar. 21, 1972

[54] APPARATUS AND METHOD FOR DETERMINING CONDUCTIVITY OF WIRING INSTALLATIONS

[72] Inventors: Douglas A. Florance, 1110 Hillside Drive, Vestal, N.Y. 13850; Lloyd P. Nordholm, 215 Castle Creek Road, Binghamton, N.Y. 13901

[22] Filed: Nov. 24, 1969

[21] Appl. No.: 879,108

[52] U.S. Cl. ................................324/51, 324/62, 324/73
[51] Int. Cl. .................................G01r 27/00, G01r 31/02
[58] Field of Search .....................324/51, 54, 55, 73, 62, 66

[56] References Cited

UNITED STATES PATENTS

| | | |
|---|---|---|
| 1,977,703 | 10/1934 | Swartwout.............................324/73 |
| 2,321,424 | 6/1943 | Rohats...................................324/54 |
| 2,585,121 | 2/1952 | Hartman................................324/62 |
| 2,806,993 | 9/1957 | Matousek..............................324/51 |
| 2,950,437 | 8/1960 | Stahl......................................324/73 |
| 3,217,244 | 11/1965 | Glover...................................324/51 |
| 3,264,562 | 8/1966 | Brown et al..........................324/62 X |

Primary Examiner—Gerard R. Strecker
Attorney—Frederick E. Bartholy

[57] ABSTRACT

An apparatus and method for determining the conductivity of wiring installations of power distribution circuits is described. Selected portions of the circuit are subjected to alternating and direct current potentials of predetermined magnitude from distinct sources. The resultant currents are alternately indicated on distinct meters at a rate higher than the mechanical inertia thereof, permitting substantially simultaneous visual observation of both indications.

5 Claims, 3 Drawing Figures 3,651,399

INVENTORS
DOUGLAS A. FLORANCE
LLOYD P. NORDHOLM

ATTORNEY

APPARATUS AND METHOD FOR DETERMINING CONDUCTIVITY OF WIRING INSTALLATIONS

BACKGROUND OF THE INVENTION

Electrical power distribution circuits are generally tested before the application of power in order to determine the quality of the work performed and the adherence to the standards set up by the National Electrical Code. Heretofore, such testing methods involved the use of ohmmeters to indicate the continuity and resistance of selected portions of the installation. Resistance checks alone are not sufficient for power installations which, at the present time, in practically all cases use alternating current. Nor does the resistance determination alone fulfill the requirements of the National Electrical Code of which Article 110–10, partially quoted states:

"The overcurrent protective devices, the total impedance and other characteristics of the circuit to be protected shall be so selected and coordinated as to permit the circuit protective devices used to clear a fault without the occurrence of extensive damage to the electrical components of the circuit. ..."

Article 250–51, entitled "Effective Grounding," reads as follows:

"The path to ground from circuits, equipment, and conductor enclosures shall (1) be permanent and continuous and (2) shall have ample carrying capacity to conduct safely any currents liable to be imposed on it, and (3) shall have impedance sufficiently low to limit the potential above ground and to facilitate the operation of over current devices in the circuit."

As seen, the code specifies, in both instances, "impedance," i.e., the resistance to alternating current. This may be quite different from that of the ohmic resistance of the wires and conduits. The following tabulation, taken from the booklet "Grounding Electrical Distribution Systems for Safety" by Eustace Soares, shows impedance with respect to the resistance of standard conduit sizes.

| Conduit Size | DC ohm K' | I density in.² | A.C.Z. | "K" |
|---|---|---|---|---|
| ½" | 0.324 | 200 | 1.57 | 4.90 |
| ¾" | 0.242 | 200 | 1.19 | 4.92 |
| 1" | 0.154 | 378 | 0.625 | 4.07 |
| 1¼" | 0.120 | 294 | 0.528 | 4.42 |
| 1½" | 0.103 | 253 | 0.611 | 4.96 |
| 2 | 0.079 | 194 | 0.435 | 5.52 |
| 3 | 0.0352 | 86.6 | 0.330 | 9.38 |

SUMMARY OF THE INVENTION

It is seen from the above that, due to the ferromagnetic properties of the material, the impedance may at times be five times greater than the ohmic resistance. It is, therefore, of great importance in the testing of electrical installations that the conductivity be determined not only to direct current, but to alternating current as well, in order to correlate the electrical characteristics of such installations.

A primary object of this invention is to provide an apparatus and method for testing electrical power installations which will indicate the true conductivity of any portion so tested.

It is a further object of this invention to provide an apparatus for testing selected portions of wiring installations by means of alternating current and direct current whereby the impedance as well as the resistance of the selected portions may be determined.

It is a particular feature of the invention that the apparatus for testing the conductivity of electrical installations indicates such conductivity to alternating as well as to direct current, utilizing individual indicating instruments switched alternately in rapid succession to the portions to be tested, allowing simultaneous observation of both indications.

It is a particular advantage of the invention that the apparatus performing the testing function is simple in construction and requires no particular aptitude for its application and operation.

A further feature of the invention resides in the method of operation, entailing simple steps which may be performed with ease by anyone without requiring professional skill.

Other objects, features and advantages will be apparent from the following description of the invention, pointed out in particularity in the appended claims, and taken in connection with the accompanying drawings, in which:

DETAILED DESCRIPTION

Figure 1:
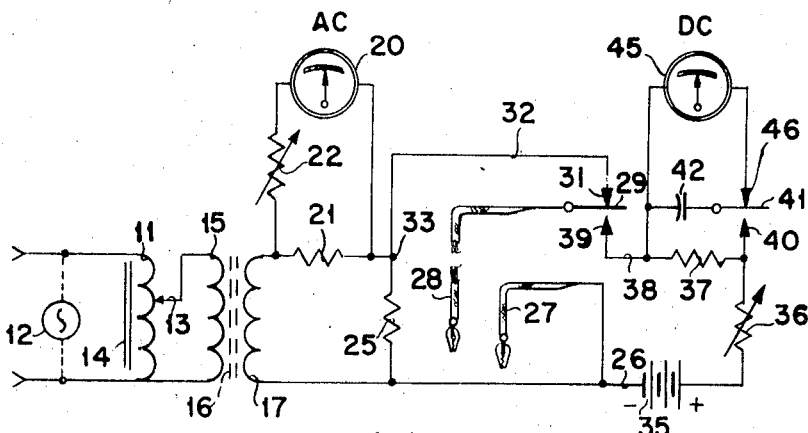
FIG. 1 is a schematic circuit of the testing apparatus.

Referring to the Figures, the schematic circuit of the testing apparatus in accordance with the invention comprises an alternating current power source represented by a variable voltage transformer 11, the input terminals of which may be connected to a suitable power line indicated as an alternating current source 12. The variable output of the transformer 11 between rider 13 and common conductor 14 connects to the primary winding 15 of a stepdown transformer 16. The output of the secondary winding 17 connects to the circuit of the first indicating meter 20. This circuit, utilizing a certain type of meter, generally comprises a shunt resistor 21 and a series resistor 22 connected to the terminals of the meter 20. A parallel resistor 25 completes this circuit. The function of this resistor will be explained later. Suffice it ,o say that application of voltage to the primary winding 15 will result in a certain current flow in the closed circuit, comprising the secondary winding 17, and resistors 21 and 25. This current will be indicated by the meter 20 in terms of voltage drop across resistor 21. The value of the current depends of course upon the position of the rider 13 of the transformer 11.

The test circuit is connected in shunt with the resistor 25 and comprises the common conductor 26 to which is connected on the test leads 27. The other test lead connects to the moving contact 29 of the relay 30. The normally closed stationary contact 31 connects through conductor 32 to the junction point 33 of resistors 21 and 25. From this is seen that when the relay 30 is not energized, the test leads 27 and 28 are placed in parallel with resistor 25, across which the test voltage is developed for the circuit to be tested.

For the testing of the direct current properties of a circuit there is provided a direct current source 35, shown here, by way of example, as a battery. One terminal of the battery 35 connects to the common conductor 26 and thereby to the test lead 27. The other terminal connects to the direct current meter circuit comprising variable resistor 36 and shunt resistor 37. One terminal of resistor 37 connects by means of conductor 38 to the normally open stationary contact 39 of the relay 30 and the other terminal of resistor 37 to another stationary contact 40 of the relay 30. The corresponding moving contact 41 thereof connects to one terminal of capacitor 42, the other terminal thereof being connected to conductor 38. One terminal of the direct current meter 45 connects to conductor 38 and the other terminal to the normally closed stationary contact 46 of the relay 30.

Examining the direct current meter circuit, it is seen that in the rest position, when relay 30 is not energized, the meter terminals are placed across the capacitor 42 so that the meter would indicate a charge of this capacitor. This indication may be in terms of voltage or in other desired magnitudes, such as ohms, by providing a suitable meter scale. On the other hand, when the relay 30 is energized so that contacts 40 and 41 are closed, the capacitor 42 is placed across resistor 37 to be charged by the voltage drop thereacross, due to current flow.

The actuation of the relay 30 is effected from a suitable source, indicated here by terminals 50 and 51 of conductors 52 and 52'. These terminals may of course be connected to any source suitable for the operation of the relay 30. This may be either direct or alternating current. In the case of alternating current, these terminals may be connected to the source 12; and, in the case of direct current, to a suitable rectifier filter assembly also supplied from the source 12.

A timer, shown in block diagram, represents a device which is capable of periodically supplying current to the output thereof represented by conductors 53 and 54 to which the winding of relay 30 is connected. In one position, the transfer switch 55 in this circuit connects the timer to the relay 30, and, in the other, disconnects the timer and connects the relay to conductor 52. As mentioned before, the function of the timer is simply to switch the relay 30 to the supply source for a selected predetermined time and switch it off for another selected time. As such, it may have various conventional forms, such as a motor-operated switch or, if desired, an electronic switch, the sequential operation of which may depend upon an oscillator producing timed pulses of desired duration. The timer may be disconnected from the supply source by means of the switch 56 and the relay 30 may be connected to the supply source by actuation of the transfer switch 55, thereby bypassing the timer.

Prior to describing the operation of the testing apparatus, it is to be noted that it is intended, as mentioned before, for the testing of wiring installations of electrical power circuits. In such installations, a point-to-point check of desired portions is rather important to make certain that conductivity is accurately determined at specified currents. By the term "conductivity" is meant, the determination of reactance and resistance and, particularly, the comparison or the ratio between alternating current resistance, namely, impedance and ohmic resistance. In such installations the total impedance of the various branches must of course be extremely small — in the range of fractions of an ohm. This is one reason why ordinary resistance checks by an ohmmeter are inadequate, inasmuch as the impedance to alternating current may be relatively high; whereas the direct current resistance is sufficiently low to indicate a satisfactory conductive path. In order to measure fractions of an ohm, adequate current must be caused to flow in the test portion to produce a voltage drop thereacross and in any series-connected element, which can be readily indicated. The circuit of meter 20 provides this current flow by virtue of the adjustable voltage input to the primary winding 15 of transformer 16. The low voltage, high current output thereof enables the user to cause a relatively large current flow in the low impedance test circuit, i.e., between the conducting path to which test leads 27 and 28 are connected. The internal resistance of the meter circuit is determined by the shunt resistor 25. The latter is chosen to be in the fractional ohm range so as not to exceed to a great extent the low impedance of the test portion. The adjustment of the reading of the meter 20, namely, the scale indication, by means of variable resistor 22, permits selection of the most useful scale on the meter for indicating the additional current which will flow through the test leads and through the portion of the circuit to be tested. Moreover, since the application is alternating current, the meter will indicate the conductivity of the test portion to this current. The application of large currents to the test circuit has another important aspect, namely, to ascertain the capability of the circuit to carry large currents, i.e., the ampere capacity thereof, referred to in technical parlance as the "ampacity."

Aside from impedance measurements, in such installations it is also important to determine the ohmic resistance of the test portion. This purpose is served by the meter 45.

METHOD OF OPERATION

In the operation, the input terminals of transformer 11 are connected to the power line available at the side where the wiring installation is to be tested. It is, of course, understood that during such tests the installation itself is disconnected from the power line source.

At the start of the test, the timer is disconnected so that relay 30 is not energized. The rider 13 of the transformer 11 is placed in a position which will result in a desired current flow in the resistor 25. The voltage produced by this current flow will be the test voltage applied to the portion of the installation to be tested. The indication of the meter 20 is then adjusted by variable resistor 22 to a point on the scale which is considered most suitable for the indication of the change of current which will result due to the connection of the test leads 27 and 28 to the circuit to be tested. It should be pointed out that resistor 25 is of a known value and so is the resistance of each test lead. The latter may vary depending upon the length which must necessarily be used and the size of the test lead conductor chosen, bearing in mind that these must be able to carry the current which may flow in the test circuit. In practice, the test current may have a value between 25 to several hundred amperes, depending upon the current-producing capabilities of the transformer 16 and the type of installation to be tested. The test leads 27 and 28 are placed between a selected portion of the wiring installation. This may, for example, be the length of a conduit which encases conductors of the installation in order to determine the ferromagnetic properties or to any other portion which will have to carry the normal operating current.

The change in indication of the meter 20 will represent the current flow in the circuit to be tested and will be higher than at the start. Although such indication would normally be shown as a current change and would have to be calculated in terms of impedance, it is just as feasible to have the meter scale calibrated in ohms directly.

In order to evaluate the ohmic resistance of the test portion, the relay 30 must be energized to transfer the test lead 28 by means of the closure of contacts 29 and 39 to the direct current side of the apparatus. This may be effected by placing the switch 55 in such position as to make contact with terminals 50, bypassing the timer. Aside from closure of contacts 29 and 39, when the relay 30 is energized, contacts 40 and 41 are also closed so that capacitor 42 is now placed across resistor 37. Current from battery 35 will now flow through the test portion between test leads 27 and 28 and resistor 37 and variable resistor 36. The voltage drop across resistor 37 produced by this current will now charge capacitor 42. When the relay 30 is deenergized, test leads 27 and 28 are transferred to the alternating current portion of the apparatus and condenser 42 transferred across the terminals of the meter 45. The latter will thus indicate the charge received by condenser 42 at the time it was placed in parallel with resistor 37. The charge of condenser 42 is of course dependent upon the voltage drop across resistor 37 produced by the current flow and thus may be used as an indication of the resistance of the portion of the circuit tested. The scale indication of meter 45 may also be chosen by adjustment of variable resistor 36 to a desired position at the start, for example, by short circuiting test leads 27 and 28.

In order to have a simultaneity of indication, the timer is placed in operation. At certain intervals it will energize the relay 30 and thereby transfer the test circuit from the alternating current side to the direct current side of the apparatus. The time intervals are so chosen that proper charging of the capacitor 42 be effected during the actuation of relay 30 and adequate time be provided for measuring the charge of the condenser during deenergizing of relay 30 while the portion of the circuit under test is subjected to alternating current flow. The frequency of switching of relay 30, i.e., the number of times it is energized during a given period is so chosen as to be fast enough to take advantage of the kinetic inertia of the meter movements. In a practical application it was found that an "off" period for the relay 30 of nine-tenths of a second and an "on" period of about one-tenth of a second gave satisfactory results.

Figure 2:
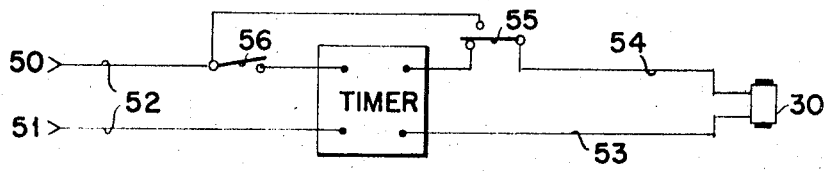
FIG. 2 is a schematic circuit, showing a timer for the actuation of the apparatus.
Figure 3:
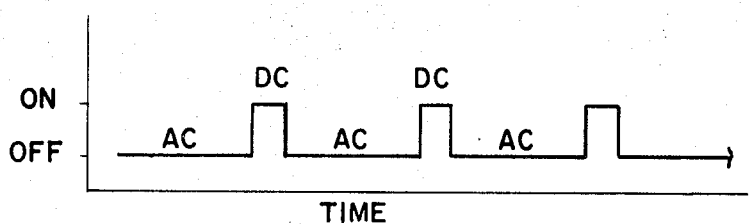
FIG. 3 is a curve showing the sequential switching of the circuits correlated to time.

The switching cycle of the timer is illustrated in the curve of FIG. 2, wherein the horizontal line represents time interval in seconds and the vertical line, the "on-off" state of the timer, i.e., the current flow in the winding of relay 30. It is to be understood that this curve is for the purpose of illustration of the desired condition and does not necessarily represent the shape of the actual current flow in the winding of relay 30. The shape of the curve of the actual current would of course be influenced by the inherent inductance and capacitance of the relay. However, this does not enter into the effective operation thereof. The recurrent and sequential operation of the moving contacts 29 and 41 of the relay 30 will thus switch the test circuit back and forth from the alternating current side to the direct current side in such rapid succession that the meter indications will appear substantially stationary so that both can be observed simultaneously by the operator. In this manner, a direct and simultaneous indication of the alternating current and direct current flow in the test portion may be taken and evaluated as to the ratio of impedance to resistance. This ratio is particularly indicative of the condition of the wiring installation to be tested.

The direct current portion need not utilize large currents inasmuch as purely ohmic resistance is of importance. On the other hand, the alternating current portion has the capability of applying large currents to the test circuits in an order larger than would normally be carried. This is particularly advantageous in determining the suitability of conductor joints as well as the proper grounding of such installations.

If it is desired to obtain greater differentials in the reactance over resistance ratio of the test portion, higher than line frequency may be utilized for the alternating current evaluation. For this purpose, a frequency converter of the rotary or solid state type may be interposed between the power source 12 and the transformer 11.

The invention in its broader aspects is not limited to the specific embodiments herein shown and described but changes may be made within the scope of the accompanying claims without departing from the principles of the invention and without sacrificing its chief advantages.

What is claimed is:

1. Apparatus for determining the conductivity of the wiring installation of electric power circuits comprising a first current indicating meter and circuit therefor, a power source of alternating current supplying said circuit, a second current indicating meter and circuit therefor, a power source of direct current supplying said last mentioned circuit, a pair of test leads adapted to be clamped between desired points of said wiring installation, switching means for alternately and sequentially connecting said leads to said meter circuits, thereby indicating current flow between said test points in reference to alternating and direct current due to the applied potentials from said respective sources said switching means including a relay for transferring said test leads between said meter circuits, a power source for said relay, and a timer controlling the sequential energizing of said relay, and the duration of the time during which said relay is actuated, whereby the indications of said meters due to the switching rate of said switching means permit apparent simultaneous observation of both alternating and direct currents.

2. Apparatus in accordance with claim 1 wherein said direct current meter circuit includes a capacitance, said switching means being operable during connection of said test leads to said meter circuit for bridging said capacitance across a predetermined resistance carrying the test current from said direct current source and transferring said capacitance during disconnection of said test leads between the terminals of said indicating meter.

3. Apparatus in accordance with claim 1 wherein each of said meters has a face plate and a movement actuating a pointer, said switching means having a transfer rate higher than the inertia of said movements whereby the indications of said meters remain substantially stationary for alternate observation.

4. The method of testing the conductivity of the wiring installation of power circuits which comprises, alternately and sequentially applying to selected portions of said circuits an electrical potential of alternating current of predetermined magnitude, and an electrical potential of direct current of predetermined magnitude, indicating the resultant currents from said applied potentials in sequential order at a rate dependent upon the inertia of the indicating means and permitting apparent simultaneous observation of said currents.

5. The method of testing the conductivity of wiring installation of power circuits which comprises, subjecting in succession a selected test portion of said installation to an alternating current source for a first predetermined time duration, causing a current flow and indicating the magnitude of said current in terms of alternating current conductivity; transferring said test portion to a direct current source for a second predetermined time duration, thereby causing a direct current flow in said portion charging a capacitance to a voltage proportional to said direct current flow during such time; thereafter transferring said test portion back to said alternating current source for the duration of said first time and simultaneously indicating the voltage charge of said capacitance in terms of direct current conductivity during said first time duration.

* * * * *